Sept. 14, 1965
G. O. FREDRICKSON
3,206,662
CONTROL CIRCUIT FOR INCREMENTALLY POSITIONING
A SYNCHRONOUS INDUCTION MOTOR
Filed March 20, 1961
2 Sheets-Sheet 1
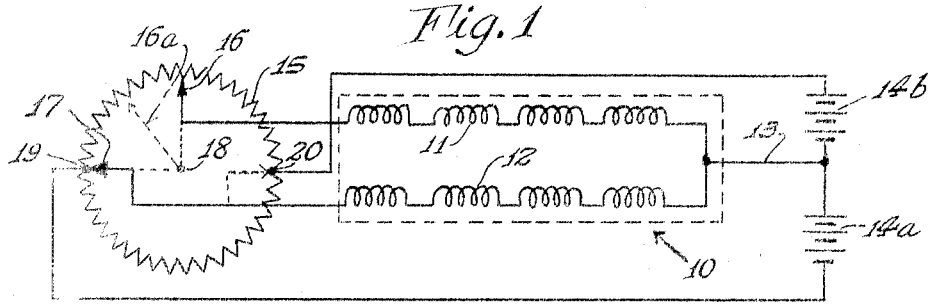
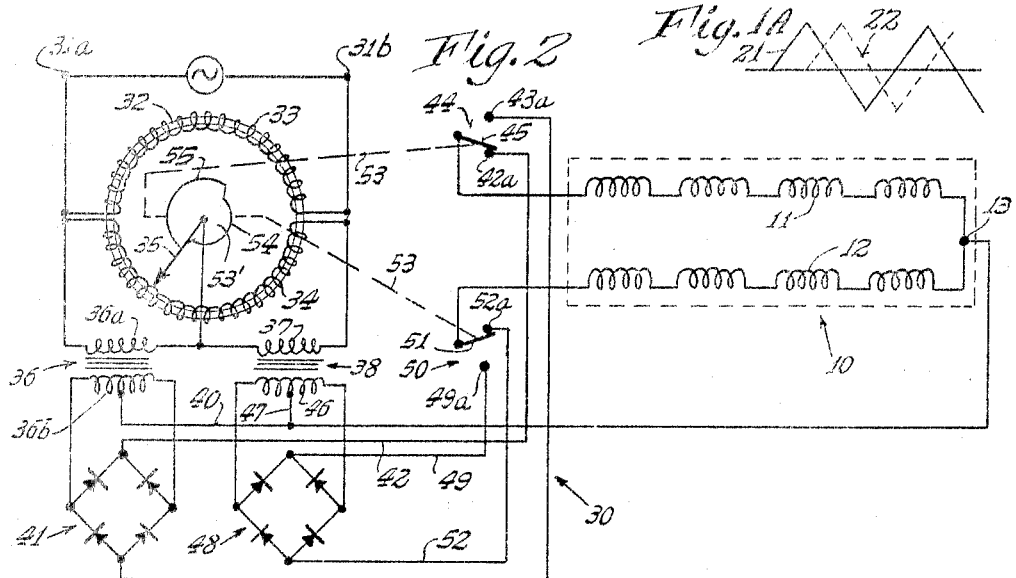
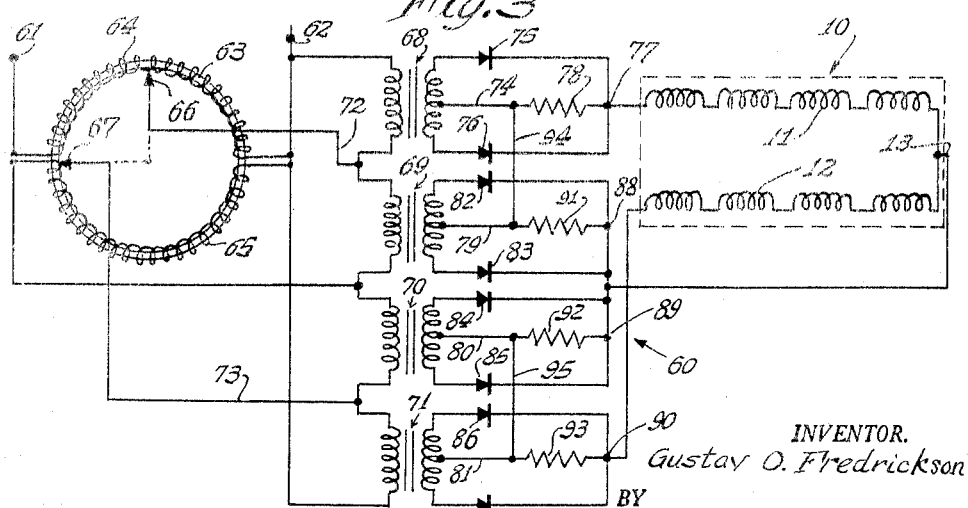
INVENTOR.
Gustav O. Fredrickson
BY
Johnson and Kline
ATTORNEYS INVENTOR.
Gustav O. Fredrickson
BY
ATTORNEYS United States Patent Office 3,206,662
Patented Sept. 14, 1965

3,206,662
CONTROL CIRCUIT FOR INCREMENTALLY POSITIONING A SYNCHRONOUS INDUCTION MOTOR
Gustav O. Fredrickson, Southington, Conn., assignor to The Superior Electric Company, Bristol, Conn., a corporation of Connecticut
Filed Mar. 20, 1961, Ser. No. 96,960
2 Claims. (Cl. 318—25)

The present invention relates to a control circuit including an electric motor in which the rotational movement of the motor is controlled and more particularly to controlling minute rotational movement of the motor.

The motor employed in the motor control circuit herein disclosed is of the synchronous inductor type, such as disclosed in U.S. Patent Nos. 2,931,929 and 2,589,999. This type of motor is, in effect, a stepping motor since it is rotationally advanced a step or increment at a time such that, for example if energized for 60 cycle alternating current, it advances 60 increments per second. While such a motor has decided advantages in many installations requiring a reversible slow speed motor, in many instances it is desired to control the rotational advancement of the motor not only for each increment but also to control the rotational movement of the motor between increments or steps. Moreover, it is also desirable to hold the rotor stationary at a selectable position within an increment instead of at just the incremental position.

It is accordingly an object of the present invention to provide a motor and control circuit therefor for controlling the rotational advancement of a stepping motor by controlling the movement between each increment.

Another object of the present invention is to provide in a motor control circuit for enabling the stopping and holding of such a stepping motor between its incremental positions.

A further object of the present invention is to provide for the rotational advancement of the motor by a control circuit that is simple in operation, composed of relatively few moving parts and is quickly and easily connected to the motor.

In carrying out the present invention wherein the rotational advancement of the rotor is not in discrete steps but is a smooth rotational advancement from one incremental position to the next, contrary to the normal operation of the motor, there is no change in the motor construction from that disclosed in the above-mentioned patents, except for the removal of a phase-shifting exterior network, for three of the four herein disclosed embodiments of the invention while the fourth will be clearly set forth. Thus the motor may have at least two adjacent stator poles with at least one winding on each pole, the changes in the magnetic polarity of the poles causing the rotor to be incrementally advanced. The objects are accomplished according to the present invention by the employment of a control circuit which is connected to the windings of the motor. The control circuit basically applies to one winding or sets thereof, a voltage which has a saw-toothed wave form such that the voltage initially begins from zero, increases to a maximum, decreases to zero and to a maximum negative, then to a zero to repeat again. Whenever the polarity of the voltage changes, the motor is stepped or incrementally advanced on step. The control circuit provides a similar voltage on the other winding but of a voltage that is maintained 90° from the voltage applied to the first winding. Thus when the voltage of one is at a maximum, the voltage of the other would be zero. By controlling, the voltage and phase relationship between the windings of the two poles, the relative magnetic polarity and strength is controlled and hence the position of the rotor with respect thereto is adjusted with of course changes producing a change in the position.

Moreover the control circuit of the present invention provides for controlling the voltage to the windings in such a manner that the voltage may be adjusted and maintained at a substantial, if not infinite, number of positions and hence provide a number of positions of the rotor between incremental positions.

Other features and advantages will hereinafter appear.

In the drawing:

FIGURE 1 is a motor and control circuit according to the present invention in which a direct current is used as a source of power.

FIG. 1-A is a diagrammatic sketch of voltages.

FIG. 2 is a modification of the circuit in FIG. 1 in which alternating current is employed as the source of power.

FIG. 3 is a motor control circuit similar to FIG. 2 except that there is no mechanical switching.

Figure 4:
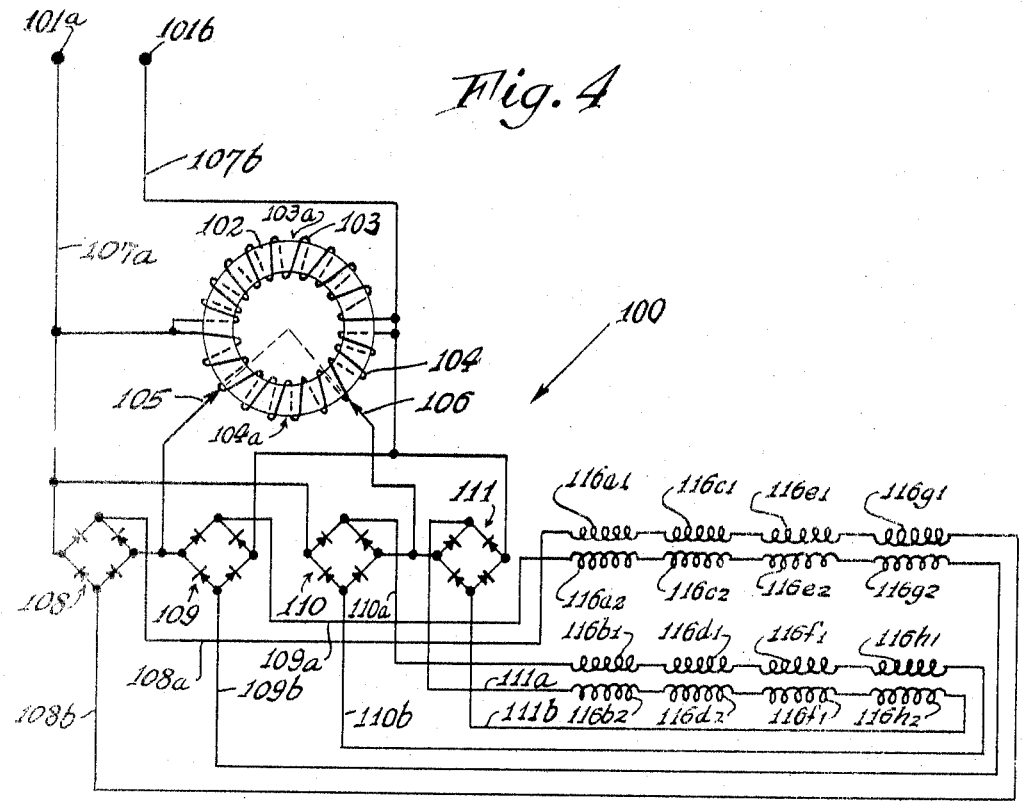
FIG. 4 is a further embodiment of the present invention in which alternating current is used as a source of energy but the motor windings are differently arranged.

Referring to the drawings, the present invention includes a motor 10, schematically shown in FIG. 1, of the type shown in the above-mentioned U.S. patents, consisting of a first set of windings 11 and a second set of windings 12. These windings are connected to a common lead 13 which is connected between a pair of series connected batteries 14a and 14b.

The control circuit in this embodiment of the invention consists of a resistor 15 such as a circularly disposed slide wire type having a pair of brushes 16 and 17 movable thereon to be in electrical engagement with the resistor at all times. The brushes are mounted for rotational movement about an axis 18 in view of the resistor being circular and are spaced exactly 90° apart. The brushes accordingly may be rotated by hand or a manipulating device in either direction on the axis 18 and be in engagement with the resistor 15 in all positions thereof in addition to being maintained stationary at the last position to which they are moved.

The negative terminal of the battery 14a is connected to a point 19 on the resistor 15 while the positive terminal of the battery 14b is connected to a point 20 on the resistor 15. The points 19 and 20 are spaced exactly 180 mechanical degrees apart and hence the potential difference between the points 19 and 20 is exactly 180 electrical degrees. The brushes 16 and 17 by being connected to be rotated simultaneously at 90 mechanical degrees apart thus have 90 electrical degrees between the voltages at the two brushes.

In the operation of the circuit of FIG. 1 if the brushes are in the position shown, it will be appreciated that there is applied to the winding set 12 a voltage which renders the brush 17 negative and the common lead 13 positive and with a potential substantially equal to the magnitude of the potential of the battery 14a, the maximum negative potential available. If, however, the brush 17 is positioned at the point 20 which may occur by rotation of the brushes 16 and 17 then the voltage across the winding set 12 will have the magnitude of the potential of the battery 14b but the lead 13 will be negative and the brush 17 positive, thus impressing the maximum positive potential on the winding set 12. This is similarly true with the brush 16 when it is positioned at the points 19 and 20 with respect to the winding set 11.

For the positions of the brushes 16 and 17 intermediate the points 19 and 20 the voltage across their respective winding sets will vary proportionally between the maximum positive and negative values of the voltage in proportion to the position of the brush between the two points 19 and 20. Thus for the position of the brush 16, shown in solid lines, the voltage across its winding set 11 is zero while if the brush were positioned in the dotted line 16a the voltage would be one-half the maximum voltage with the lead 13 being positive and the brush 16a negative.

It will thus be seen that, as shown in FIG. 1–A, the resistor 15 and brushes 16 and 17 constitute in effect a saw-tooth voltage generator that impresses the voltage across the winding set 11, a voltage corresponding to the wave shape 21 while a voltage indicated by the dotted wave form 22 is placed across the winding set 12 with the wave forms being identical but 90 electrical degrees apart. Accordingly rotation of the brushes 16 and 17 creates potentials corresponding to the wave forms 21 and 22 and these are impressed across the winding sets 11 and 12 which in turn are sufficient to cause the motor to advance one increment with each one-half revolution of the brushes 16 and 17, thereby effecting one step of the motor.

The number of positions of the brushes 16 and 17 depends upon the size and structure of the resistor 15 which in turn determines the number of positions of the rotor which is available between incremental positions. Moreover, if the brushes 16 and 17 are caused to be rotationally advanced in either direction at a constant speed then the motor will also advance it a constant speed and not in steps as heretofore has been the practice.

Shown in FIG. 2 is a further embodiment of the present invention embodying the same motor and hence is indicated by the same reference numeral 10, having the same sets of windings 11 and 12 and a common lead 13. The embodiment of the motor control circuit generally indicated by the reference numeral 30 in the schematic diagram, FIG. 2, utilizes an alternating current source of power to obtain substantially the same wave shapes shown in FIG. 1 that are impressed across the winding sets and thus be able to control the motor in a manner similar to that described in connection with the embodiment shown in FIG. 1.

The motor control circuit 30 has a pair of input terminals 31a and 31b connectible to a source of alternating current. Rather than employ a resistor this embodiment of the invention utilizes transformer action by employing an annular magnetic core 32 on which is toroidally wound for one-half thereof a winding 33 and on the other half a winding 34; the windings are wound in opposite directions on the core 32 and are formed to have a commutating track such as is present on commercially available adjustable voltage autotransformers. A brush 35 is mounted for rotation in any well-known manner to ride in electrical engagement on the windings 33 and 34.

The windings are energized from the terminals 31a and 31b such that adjacent ends of the windings are connected to the same terminal. The brush is electrically connected to one end of a primary winding 36a of a transformer 36 with the other end of the primary winding 36a being connected to the terminal 31a. Similarly there is provided a primary winding 37 of a transformer 38 having one end connected to the brush 35 and its other end to the terminal 31b. The secondary winding 36b of the transformer 36 is center tapped by a lead 40 while the ends of the winding 36b are connected to opposite input junctions of a full-wave rectifier 41. A positive lead 42 and a negative lead 43 connect the output of the rectifier 41 to terminals 42a and 43a respectively of a switch 44 having switch arm 45.

Similarly the transformer 38 has a secondary winding 46 center tapped by a lead 47 that is connected to the lead 40 while the ends of the winding 46 are connected to opposite input terminals of a full-wave rectifier 48. A positive lead 49 from the rectifier 48 connects to a terminal 49a of a switch 50 having a switch arm 51 while a negative lead 52 connects to a terminal 52a of the switch 50. The switch arm 51 is connected to the set of windings 12 while the switch arm 45 is connected to the winding set 11 and the common lead 13 is connected to the center tapped leads 40 and 47 of the transformers 36 and 38 respectively.

It will be appreciated that with the construction shown that the voltage across the leads 42 and 43 will vary from zero to maximum while the voltage across the leads 49 and 52 will also vary but from maximum to zero. The sum of these two voltages at all positions of the brush however will remain constant. Moreover, when one is at maximum, the other is at a minimum and hence the 90° electrical differential between the two voltages is maintained.

While the magnitude of the voltage across the windings in the heretofore described structure of the embodiment of this invention is adjusted by the movement of the brush 35 in order to effect the change of polarity of the voltage across the winding sets for each one-half revolution of the brush 35, there are provided mechanical connections 53 to the switch arms 51 and 44 that are diagrammatically shown and which are actuated by a cam 53' coaxially mounted to rotate with the brush 35. The cam has a small diameter portion 54 and a large diameter portion 55, each of which extends for 180°. The switches 44 and 50 are of the type wherein they normally engage the contacts 43a and 52a when their actuating mechanism engages the small cam portion 54 while the large cam portion 55 holds the switch arms 45 and 51 at the terminals 42a and 49a respectively. Moreover, the actuating mechanism for the switch arms is positioned on diametrically opposite sides of the cam 53' so that the switch arms are moved whenever the brush is at the junction of the ends of the two windings. Thus switch 50 has its switch arm changed from terminal 52a to 49a when the brush 35 is at the junction of the two windings 33 and 34 connected to the input terminal 31a, and simultaneously while the switch arm 44 in this position of the brush is shifted from 42a to 43a. Thus when the brush 35 is riding on the winding 34 the switch arms are in the solid line position shown, while when the brush is riding on the winding 33 the switch arms are in their other position.

With the brush 35 in the position shown and the switches in their solid line position, the terminal 42a is positive and hence the common lead 13 is negative for the winding set 11. For the winding set 12 the switch arm 51 is negative and the common lead 13 positive. Of course, when the brush 35 rides on the winding 33 the switches 44 and 50 are reversed such that the switch arm 45 is negative and the switch arm 51 is positive causing the polarity of the voltage through their respective winding sets to be changed.

Shown in FIG. 3 is a further embodiment of the present invention of a motor control circuit and a motor in which the energizing source is again alternating current but in which mechanical switching shown in the immediate previously described embodiment is eliminated. The motor is again generally indicated by the reference numeral 10 and is composed of sets of windings 11 and 12 and a common lead 13. The motor control circuit in this embodiment is generally indicated by the reference numeral 60 and has input terminals 61 and 62. An annular core 63 of magnetic material shown schematically has toroidally wound thereon a winding 64 for one-half of its circumference while the other half has a winding 65 toroidally wound thereon with one pair of adjacent ends of the windings being connected to the input terminal 61 while the other pair of adjacent ends are connected to the input terminal 62 as in the embodiment shown in FIG. 2 and the windings are each formed with a commutating track. However, in order to eliminate mechanical switching, there is provided a pair of brushes 66 and 67 which are mounted on a common shaft that is rotatably mounted to be coaxial with the windings 64 and 65 so that the brushes, by rotation of the shaft may be moved along the commutating tracks of the windings in electrical engagement therewith. The brushes are spaced 90 mechanical degrees apart on the shaft and because of the windings being energized by single phase alternating current, provide voltages that are 90 electrical degrees apart.

This embodiment of the motor control circuit includes isolation transformers 68, 69, 70 and 71. The primary windings of the transformers 68 and 69 have their adjacent ends connected together and to a lead 72 that is electrically connected to the brush 66 while the other ends of the windings of the two transformers are connected to input terminals 62 and 61 respectively. Similarly the transformers 70 and 71 have adjacent ends of their primary windings connected together to a lead 73 which is electrically connected to the brush 67. The other ends of these windings are connected to input terminals 61 and 62. The secondary winding of the transformer 68 is center tapped by a lead 74 while the ends of this secondary winding are connected to one-way valves or diodes 75 and 76 to a common junction 77 connected to the set of windings 11. A resistor 78 is positioned between the junction 77 and the lead 74.

Similarly the transformers 69, 70 and 71 have center tapped leads 79, 80 and 81, diodes 82 and 83, 84 and 85 and 86 and 87, common junctions 88, 89 and 90 and resistors 91, 92 and 93 respectively. A lead 94 connects the center tapped leads 74 and 79 of transformers 68 and 69 while a lead 95 connects center tapped leads 80 and 81 of transformers 70 and 71. Moreover, the common junctions 88 and 89 of transformers 69 and 70 are connected to the common lead 13 while the junction 90 of transformer 71 is connected to the set of windings 12.

With this motor control circuit, as shown in FIG. 3, the transformers 68 and 69 and their associated circuits are arranged to push pull each other to deliver the algebraic sum of the voltage impressed on their primary windings to the winding set 11 while the same occurs with respect to the transformers 70 and 71, their associated circuits and the winding set 12. Thus, for example, with the brush 67 positioned, as in this figure, the voltage across the primary winding of the transformer 70 is zero since both ends are in effect connected to the input terminal 61 while the full voltage is impressed upon the primary winding of the transformer 71.

Thus, for the half of the cycle of alternating current at the input terminals which has the terminal 61 positive, energization of the winding set 12 is effected by a circuit through the diode 87, junction 90, winding set 12, common lead 13, junction 89, resistor 92, connecting lead 95 to the center tap 81. For the other half of the input cycle wherein the input terminal 61 is negative, voltage flows in a circuit including the diode 86 and components 90, 12, 13, 89, 92, 95 and 81. The value of the voltage is the maximum for this position of the brush that can be impressed on the winding set and for the position of either brush half way between the ends of the windings, as brush 66 is positioned, the voltages across the primary windings of the transformers 68 and 69 is the same resulting in a potential at the junction 77 which is the same as the potential in the common lead 13 and hence there is no voltage or current flow through the winding set 11.

For brush positions between the two brush positions heretofore described, the voltage across the winding set will depend upon the difference between the voltage applied to one primary winding and the voltage applied to its cooperating primary winding which in turn is dependent upon the relative position of the brush between the end of the winding and the mid-point of the winding. Moreover, the polarity of the voltage will depend upon whether the brush is located in the semi-circular arc containing the end of the windings 64 and 65 connected to the input terminal 62 or the other semi-circular arc having the ends of the windings 64 and 65 connected to the terminal 61. The resistors 78, 91, 92 and 93 serve to provide a return path of desired impedance.

Figure 5:
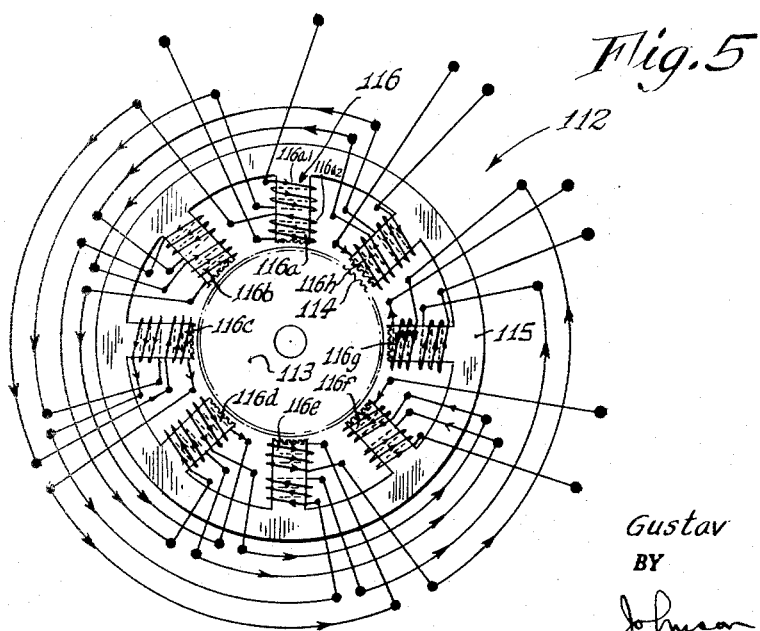
FIG. 5 is a cross-sectional, somewhat schematical, view of a motor employed in the embodiment of the present invention shown in FIG. 4.

Referring to FIGS. 4 and 5, there is disclosed a further embodiment of the present invention in which the same results are achieved only in this embodiment in addition to having a different motor control circuit, a somewhat different motor is employed. Thus while the motor is of the same general type as heretofore set forth, it has two independent windings on each of its poles instead of one.

Referring to these figures, the motor control including the motor is generally indicated by the reference numeral 100 and includes a pair of input terminals 101a and 101b connectible to a source of alternating current. An annular magnetic core 102 has a pair of windings 103 and 104 toroidally wound thereon in opposite direction and as in the previous embodiment each winding is formed with a commutating track. A pair of brushes 105 and 106 are fixed 90 mechanical degrees apart and are mounted to be rotatable about the windings in engagement with the turns thereof. Further, each of the windings 103 and 104 as shown are energized from the input terminals 101a and 101b through leads 107a and 107b.

In order to provide direct current for energizing the winding sets when input terminals 101a and 101b are energized by alternating current, there is provided four full-wave rectifiers 108, 109, 110 and 111. The full-wave rectifier 108 has A.C. applied between terminal 101a and the brush 105 while the rectifier 109 is energized by the brush 105 and the terminal 101b. The rectifier 110 is energized from the terminals 101a and the brush 106 while the rectifier 111 is energized from the brush 106 and the terminal 101b.

With this structure and the conduction of the rectifiers in the direction of their arrows, the voltage between the leads 108a and 108b, the output leads of the rectifier 108, will be the voltage between the terminal 101a and the voltage of the brush 105 as determined by its position on the windings 103 and 104. The output voltage of the rectifier 109 across its output leads 109a and 109b will be the voltage between the brush 105 and the terminal 101b. When the brush 105 is positioned at the junction between the windings 103 and 104 connected to the terminal 101a the voltage between the leads 108b and 108a is zero while the voltage between the leads 109a and 109b is the maximum. The reverse is true when the brush 105 is at the junction of the windings 103 and 104 with the terminal 101b. At a setting half way between the ends of each of the windings the voltages across the leads will be equal. Hence at all positions of the brush 105 the sum of the voltages across the leads 108a and 108b and 109a and 109b will be constant.

The same is true with respect to the voltages across the rectifier 110, output leads 110a and 110b and output leads 111a and 111b of rectifiers 110 and 111. However, in view of the brush 106 being 90 mechanical degrees removed from the brush 105 and the input terminals being energized by single phase alternating current, the voltages in the leads of the rectifiers 110 and 111 will be 90 electrical degrees different from the voltages from the rectifiers 108 and 109.

Instead of employing exterior switches or push-pull transformer circuits to effect the change in the magnetization of the poles of the motor, the embodiment of the invention provides for a motor in which each of the poles has two independent windings thereon. Thus, referring to FIG. 5, the motor generally indicated by the reference numeral 112 is provided with a rotor 113 having peripherally formed teeth 114 in addition to the other structure of the rotor disclosed in the heretofore referred to U.S. patents. The stator 115 includes an annular ring of magnetic material with inwardly projecting poles, generally indicated by the reference numeral 116, there being eight poles denoted 116a, 116b, 116c, 116d, 116e, 116f, 116g and 116h and with the peripheral portion of each of the poles being formed with teeth as also disclosed. However, the only difference in this motor as compared to the heretofore known motors, is that instead of having one winding for each pole there is provided two windings. Thus the pole 116a has a winding 116a1 and another winding 116a2. The windings 116a1 and 116a2 are both wound in the same direction on the pole. However the current flow therein, as indicated by the arrows on the turns of the winding, is in the opposite direction such that energization of the winding 116a1 magnetizes the pole 116a north while energization of the winding 116a2 magnetizes the pole with a magnetization of the opposite polarity, namely south. Thus, if each were both energized with the same value of current then the magnetization of the pole would be nothing while if different values of currents energize the windings, then the net magnetizing of the pole is the algebraic sum of the currents.

The other poles are the same and similarly have two windings of the same construction with the windings being 116b1 and 116b2, 116c1, 116c2, etc.

Referring to FIG. 4, the windings are shown in their manner of interconnection such that the windings are divided into four serially connected sets. Set I includes winding 116a1, 116c1, 116e1 and 116g1; set II includes 116a2, 116c2, 116e2 and 116g2; set III includes the windings 116b1, 116d1, 116f1, 116h1 and the last set IV includes windings 116b2, 116d2, 116f2, 116h2.

The windings in each of the groups alternate as to their direction of winding on the poles such that when the set I is energized pole windings 116a1 and 116e1 will magnetize their respective poles north while windings 116c1 and 116g1 will magnetize their respective poles south, the other groups being the same as shown in the schematical diagram wherein a counterclockwise winding such as 116a1 would magnetize, upon energization a pole north while a counterclockwise winding such as winding 116c1 would magnetize a pole south.

The windings of set I are connected to be energized by the leads 108a and 108b; with the current flowing from the former to the latter for both polarities of the input terminal 101a; set II is energized by the leads 109a and 109b with lead 109a being maintained positive; set III is energized by the leads 110a and 110b while set IV is energized by leads 111a and 111b, with the leads 110a and 111b respectively being maintained positive.

The operation of this embodiment of the motor control circuit and motor causes the rotor 113 of the motor to be advanced one increment for every one-half turn of the brushes 105 and 106 in a smooth advancement between the incremental positions. Thus as the brush 105 for example moves from the mid-point 104a of the winding 104 to the mid-point 103a of the winding 103, the polarity of the pole 116a changes from nothing to a maximum north to nothing while further rotation of the brush 105 in the same clockwise direction changes the magnetic polarity of the pole 116a from nothing to south to nothing; thus completing one incremental advance of the rotor. Naturally the other poles will change their polarity in a similar manner. Moreover the brushes 105 and 106 may be rotated in the reverse direction to cause the rotor to move in the reverse direction. If desired, of course, the brushes may be set at any position and the rotor will be held at its proportional position between incremental positions as the brushes are set from the ends of the windings 103 and 104.

It will accordingly be appreciated that there has been disclosed a motor control circuit including a motor in which the motor while normally of the stepping type, i.e. jumps from one position to another, is caused by the present invention to be smoothly shifted from one position to its next incremental position. The rotor of the motor may be stopped and held at any position between its incremental positions in addition of course to at the incremental positions. Moreover each of the circuits disclosed provides for enabling the motor to be advanced in the same manner in the reversed direction as the motor control is reversed in direction.

Variations and modifications may be made within the scope of the claims and portions of the improvements may be used without others.

I claim:

1. A motor control circuit for a synchronous induction motor of the type having at least two stator poles that have their magnetic polarity changed from one to the other alternately and a magnetized rotor coacting therewith, said rotor and said poles each being formed with a plurality of cooperating peripheral teeth and each increment of movement being a fraction of a tooth pitch with one revolution of the rotor requiring many increments of movement, a first winding means inductively associated with the first pole and a second winding means inductively associated with the second pole with the electrical energization of the windings being controlled by said control circuit, said control circuit including means connectible to a source of electrical energy, adjustable means connected to the first winding means for shifting the phase of the current to the first winding means to change the magnetic polarity of the first pole and connected to the second winding means for shifting the phase of the current to the second winding means to change the magnetic polarity of the second pole, said means maintaining the phase of the current to the first winding means with respect to the phase of the current to the second winding means substantially ninety electrical degrees apart at all positions of adjustment, and in which the source of electrical energy is alternating current, the adjustable means includes a transformer having a winding with the winding ends being connected to one side of the source and the winding center to the other side, a pair of spaced apart taps movable on the winding, means connected to one tap and the source for applying a rectified voltage of a magnitude and polarity determined by the position of one of the taps to the first winding means and means connected to the other tap and the source for applying a rectified voltage of a magnitude and polarity determined by the position of the other of the taps to the second winding means.

2. The invention as defined in claim 1 in which each of the winding means includes a first coil and a second coil, the source of electrical energy is alternating current, the adjustable means includes a transformer having a winding with the winding ends being connected to one side of the source and the winding center being connected to the other side of the source, a pair of spaced apart taps movable on the winding means connected to one tap and the source and the first winding means for applying to one coil a rectified voltage having a magnitude determined by the position of the one tap on the winding and applying to the other coil a rectified voltage with the sum of the voltages being substantially equal to the source voltage, means connected to the other tap and the source and the second winding means for applying to one coil a rectified voltage having a magnitude determined by the position of the second tap on the winding and applying to the other coil a rectified voltage with the sum of the voltages being substantially equal to the source voltage.

References Cited by the Examiner

UNITED STATES PATENTS

| | | | |
|---|---|---|---|
| 2,402,928 | 6/46 | Summers | 318—27 |
| 2,424,843 | 7/47 | Owsley | 318—25 X |
| 2,452,784 | 11/48 | Noodleman | 318—25 |
| 2,599,406 | 6/52 | Mikolic | 318—25 |
| 2,774,922 | 12/56 | Thomas | 310—49 |

JOHN F. COUCH, *Primary Examiner.*